United States Patent Office 2,954,287
Patented Sept. 27, 1960

2,954,287
PROCESS OF FORMING PHOSPHATE SOLUTIONS

John N. Carothers and Rudolph J. Hurka, Jr., both of 1629 Lady Marion Lane NE., Atlanta, Ga.

No Drawing. Filed Mar. 29, 1957, Ser. No. 649,309

9 Claims. (Cl. 71—40)

This invention relates to the solubilization of high grade Florida phosphate rock with sulfuric acid for the production of phosphates, particularly dicalcium phosphate, from the solution thus formed. It has for an object the provision of a process whereby a phosphate solution is obtained which shall be low in aluminum and fluorine and from which solution low fluorine phosphates for industrial and chemical uses can be produced without the necessity of partial neutralization for the removal of fluorine.

A more specific object of our invention is to provide a process for solubilizing phosphate rock with sulfuric acid in the presence of substantial quantities of an inorganic salt of an alkali metal, such as potassium or sodium together with a sufficient amount of water, whereby a solution low in aluminum and fluorine is produced.

As is well known in the art to which our invention relates, when phosphate rock is solubilized with sulfuric acid in processes hertofore employed, considerable quantities of impurities were dissolved from the rock and were troublesome to remove from the solution. Among these impurities were Fe, Al, and F. In removing Fe, Al and F in such prior art processes it was necessary to employ elaborate complicated and expensive chemical treatments. Waggaman in his work entitled "Phosphoric Acid, Phosphates and Phosphatic Fertilizers," 2d ed., p. 299, summarizes the difficulties with respect to removing Fe and Al by stating: "These impurities are the most costly to remove from $H_3PO_4$ since when precipitated they carry with them very appreciable quantities of $H_3PO_4$ which is so combined that it cannot be removed by leaching with water or dilute acid."

In the solubilizing of phosphate rock with sulfuric acid we have discovered certain factors which were heretofore unknown or unrecognized and which affect the precipitation of fluorine from a phosphate solution. One of these factors is of primary significance. We have discovered that where the proportion of aluminum in a phosphate solution is relatively high, it makes fluorine very difficult to remove by precipitation in any heretofore known way. We have also discovered that the character of the acidifying solution has an important influence as to the impurities which appear in the phosphate solution. For example, the filtrate from a solubilization in which $H_3PO_4$ is made, will contain different quantities and proportions of impurities compared to the filtrate when the solubilization is on the basis of approximately 80% of that necessary to form phosphoric acid. In the process hereinafter described, we prefer to use approximately 2.06 parts by weight $H_2SO_4$ to each part by weight of $P_2O_5$ in the rock which is approximately 80% of that required to produce phosphoric acid, together with 1700 to 2500 parts water per 1000 parts phosphate rock.

We have discovered that if there be added to the sulfuric acid solution above described a substantial amount of one or more inorganic salts of potassium or sodium, such as sodium chloride, potassium chloride, sodium orthophosphate, potassium orthophophate, sodium sulfate and potassium sulfate, and the phosphate rock be solubilized therewith, the phosphate solution thus obtained contains a much smaller quantity of aluminum and fluorine than one solubilized by the use of sulfuric acid alone. The solubilizing solution employed should contain from 280 to 400 parts of sulfuric acid to 1000 parts of water and should contain at least 0.6 part mol alkali metal ions per 1000 parts of water in order to obtain the best results. The phosphate solution thus produced may be neutralized with calcium carbonate, lime, or limestone to produce dicalcium phosphate low in fluorine without any intervening, elaborate chemical treatment for the removal of aluminum and fluorine.

For example, when high grade Florida phosphate rock containing around 34% $P_2O_5$, 1% $Al_2O_3$, and 3.8% F is solubilized with 80% of the amount of sulfuric acid required to produce phosphoric acid as above described without the addition of potassium or sodium salts, the filtrate from such a process will be found to contain from 10% to 15% $P_2O_5$ and will contain from 25% to 40% of the aluminum, and from 50% to 70% of the fluorine in the rock being solubilized. On the other hand, where the solubilization is carried out with an acid solution as specified containing sodium or potassium salts or a mixture of the two at a temperature not exceeding 80° C. the quantity of aluminum and fluorine appearing in the filtrate, is very greatly lessened, ranging in the neighborhood of from 2% to 10% of the aluminum and from 5% to 15% of the fluorine in the rock so treated, depending upon the temperature at which the solubilization is made and on the strength of the solution.

In order that our process may be more fully understood, the following examples are illustrative of the preferable ways of carrying out our invention.

*Example 1*

407.0 parts ground high grade Florida phosphate rock (33.5% $P_2O_5$)
280 parts $H_2SO_4$ (as 288.7 parts 97% $H_2SO_4$)
730.0 parts of water, total
27.4 parts NaCl Prior to solubilization, 5.7 parts of NaCl was dissolved in 150 parts of water, and then mixed with the ground rock. The acid was diluted with 580 parts of water, and cooled to below 65° C., and 21.7 parts of NaCl were dissolved therein. Then the acid-salt solution was added to the rock-NaCl-water mixture. The temperature of the final mixture was about 70–80° C.; although at 60° C. very satisfactory results have been obtained. The acid was added to the rock over a period of 20 to 45 minutes. A reacting time of 2 to 3 hours after the acid addition was sufficient for satisfactory solubilization of the $P_2O_5$. The solution was then filtered. The filtrate contained about:

$P_2O_5$ -------- 15%.
Ca ---------- 1.3%.
F ----------- 0.22% (around 13% of the F in the rock).
Fe ---------- 0.24%.
Al ---------- 0.01% (around 5% of the Al in the rock).

*Example 2*

407.0 parts ground high grade Florida phosphate rock (33.5% $P_2O_5$)
280.0 parts $H_2SO_4$ as (288.7 parts 97% $H_2SO_4$)
730.0 parts water, total
34.9 parts potassium chloride Prior to the solubilization 7.2 parts of potassium chloride was dissolved in 150 parts of water, and then mixed with the ground rock. 27.7 parts of potassium chloride was dissolved in the diluted and partly cooled acid.

The acid was added to the rock-potassium chloride-water mixture at a uniform rate, which required 30 minutes for complete addition. The mixture was stirred vigorously during the addition of acid, and the maximum temperature of the mix was 60° C. After the acid was added, the mixture stood at 60° for 2 hours, and was then filtered. The filter cake was washed with water, to recover the soluble $P_2O_5$. The filtrate contained:

| | Percent |
|---|---|
| $P_2O_5$ | 15 |
| Al | .018 |
| F | .12 |

When both sodium and potassium salts are present in the solubilization mixture a satisfactory solution may be obtained at 80° C. The following is an example of quantities, procedure, and results obtained.

Example 3

407 parts ground high grade Florida phosphate rock (33.5% $P_2O_5$)
280 parts $H_2SO_4$ (as 288.7 parts 97% $H_2SO_4$)
27.4 parts NaCl
34.9 parts KCl
730.0 parts water, total Prior to solubilization 7.2 parts of KCl and 5.7 parts of NaCl were dissolved in 150 parts water, and mixed with the ground rock. After dilution and cooling the acid to 60–65° C., 27.7 parts KCl and 21.7 parts NaCl were dissolved therein. The acid was added to the rock-salt solution mixture. The mixture was stirred vigorously during the addition of acid and the maximum temperature of the mixture was 80° C. during the entire solubilization. The first 20% of the acid was added in about 5 minutes and all of the acid was added in about 35 minutes. After the acid was all added the reacting mixture stood with periodic stirring, for about 2 hours before being filtered. The filtrate contained:

| | Percent |
|---|---|
| $P_2O_5$ | 14 |
| F | 0.14 |

The solution was neutralized with $CaCO_3$ as hereinafter described to form dicalcium phosphate which had a P to F ratio of better than 120 to 1.

While as hereinbefore stated, the solutions described may be employed to produce a variety of low fluorine phosphates, our improved process is especially adapted to the production of low fluorine dicalcium phosphate which is used in large quantities as a cattle food supplement.

Following is an example of a procedure which may be employed to produce dicalcium phosphate, following our improved process.

Example 4

To 600 parts of the solution described in Example 2, the equivalent of 0.32 part of $SiO_2$ as a solution of water soluble silicate was added, and allowed to stand and cool for 8 hours, during which time a small additional quantity of fluorine containing solid settled out, lowering the fluorine content of the solution to approximately 0.035%. 500 parts of the solution thus obtained was heated to 95–100° C. and 84 parts $CaCO_3$ was added in such a manner that it reacted largely as added, forming dicalcium phosphate. After the dicalcium phosphate was formed, it was separated from the solution, and dried. The P to F ratio in the dicalcium phosphate was approximately 200 to 1. After the dicalcium phosphate was formed and separated, the filtrate was returned to be used with a succeeding batch. The alkali metal salt solution may be employed repeatedly in subsequent solubilizations adding thereto only sufficient salt to compensate for that removed with the solids separated from the solution.

The solutions described in Examples 1 and 3 were treated in a similar way and produced low fluorine dicalcium phosphate.

Wherever in this specification the term "parts" is used, parts by weight is intended.

We wish it to be understood that we do not desire to be limited to the exact details of the process shown and described, for obvious modifications will occur to a person skilled in the art.

What we claim is:

1. The process of producing a filterable phosphate solution comprising reacting high grade Florida phosphate rock with an aqueous sulfuric acid solution in which the $H_2SO_4$ is in the proportion of approximately 2.06 parts to each part of $P_2O_5$ in the rock and in which the sulfuric acid solution contains sufficient water to produce a phosphate solution, and said sulfuric acid solution containing a substantial amount of an inorganic salt of an alkali metal selected from the group consisting of sodium chloride, potassium chloride, sodium orthophosphate, potassium orthophosphate, sodium sulfate and potassium sulfate, in which the temperature of the reacting mix does not exceed 80° C. separating the solution from the solids, adding a water soluble silicate to the solution, and separating the resulting solution from the precipitate.

2. A process as defined in claim 1 in which the solution finally obtained is reacted with a neutralizing agent selected from the group consisting of calcium carbonate, lime and limestone in an amount sufficient to form dicalcium phosphate, and in which the dicalcium phosphate is separated from the solution.

3. In a process of forming a solution from high grade Florida phosphate rock to contain from 2% to 10% of the aluminum and from 5% to 15% of the fluorine contained in said rock and in which the said phosphate rock is reacted with an aqueous sulfuric acid solution containing from 280 to 400 parts sulfuric acid per thousand parts of water, the improvement which consists in adding to the sulfuric acid solution at least one inorganic salt of an alkali metal selected from the group contisting of sodium chloride, potassium chloride, sodium orthophosphate, potassium orthophosphate, sorium sulfate and potassium sulfate, the salt in the solution being at least 0.6 part mols alkali metal ions per 1000 parts of water, and the $H_2SO_4$ in the solution being in the ratio of approximately 2.06 parts per part of $P_2O_5$ in the rock being solubilized, maintaining the temperature below 80° C. during solubilization, and separating the phosphate solution from the solids.

4. A process as defined in claim 3 in which the water in the solubilizing solution is in the proportion of 1700 to 2500 parts per 1000 parts of phosphate rock.

5. A process as defined in claim 4 in which the rock is first wetted with an aqueous solution containing the alkali metal salt before solubilization.

6. A process as defined in claim 3 in which the phosphate solution obtained is treated with a water soluble silicate, again filtered, and neutralized with calcium carbonate to form dicalcium phosphate, and in which the dicalcium phosphate is separated.

7. A process as defined in claim 3 in which the alkali metal salt employed is sodium chloride and the phosphate solution obtained is treated with water soluble silicate, the phosphate solution is then separated from solid material, and is reacted with a neutralizing agent selected from the group consisting of calcium carbonate, lime and limestone in amount sufficient to form dicalcium phosphate, separating the dicalcium phosphate from the solution, and returning the solution for use in a subsequent solubilization.

8. A process as defined in claim 3 in which the alkali metal salt employed is potassium chloride and the phosphate solution obtained is treated with water soluble silicate, the phosphate solution is then separated from solid material, and is reacted with a neutralizing agent selected from the group consisting of calcium carbonate, lime and limestone in amount sufficient to form dicalcium phosphate, separating the dicalcium phosphate from the solution, and returning the solution for use in a subsequent solubilization.

9. A process as defined in claim 3 in which the alkali metal salt employed is a mixture of sodium chloride and potassium chloride each comprising at least 0.6 part mols per 1000 parts water in the solution and the solution obtained is treated with water soluble silicate, the solution is separated from solid material, and is reacted with a neutralizing agent selected from the group consisting of calcium carbonate, lime and limestone in amount sufficient to form dicalcium phosphate separating the decalcium phosphate from the solution, and returning the solution for use in a subsequent solubilization.

References Cited in the file of this patent

UNITED STATES PATENTS

| | | |
|---|---|---|
| 2,164,627 | Seyfried | July 4, 1939 |
| 2,557,730 | Ettel | June 19, 1951 |
| 2,683,075 | Caldwell | July 6, 1954 |
| 2,700,605 | Hornibrook | Jan. 25, 1955 |
| 2,783,139 | Datin | Feb. 26, 1957 |
| 2,851,335 | Heinerth | Sept. 9, 1958 |